United States Patent [19]

Zwolle

[11] Patent Number: 4,506,732

[45] Date of Patent: Mar. 26, 1985

[54] METHOD FOR INCREASING THE BONDING STRENGTH BETWEEN GRAINS IN A SUBSURFACE FORMATION ZONE

[75] Inventor: Simon Zwolle, Rijswijk, Netherlands

[73] Assignee: Shell Oil Company, Houston, Tex.

[21] Appl. No.: 602,046

[22] Filed: Apr. 19, 1984

[30] Foreign Application Priority Data

Jul. 7, 1983 [GB] United Kingdom ............... 8318386

[51] Int. Cl.$^3$ ........................................... E21B 33/138
[52] U.S. Cl. ..................................... 166/292; 166/300
[58] Field of Search ............... 166/276, 281, 292, 293, 166/300

[56] References Cited

U.S. PATENT DOCUMENTS

| | | | |
|---|---|---|---|
| 2,808,886 | 10/1957 | Bail et al. | 166/268 X |
| 3,138,205 | 6/1964 | Kerver et al. | 166/300 X |
| 3,252,513 | 5/1966 | Holmes | 166/293 |
| 4,061,191 | 12/1977 | Meijs et al. | 166/292 |

OTHER PUBLICATIONS

Davies et al., "'Silicalock'-A Novel Sand-Control Process for Gas Wells", *Journal of Petroleum Technology,* Nov. 1983, pp. 2087-2094.

*Primary Examiner*—George A. Suchfield

[57] ABSTRACT

Method for increasing the bonding strength between grains in a subsurface formation zone with water-wet pore space walls, and located adjacent to a well penetrating said formation, wherein silicon polyhalide in a dry carrier fluid is passed into the said zone, the silicon polyhalide having a water reactivity substantially equal to that of silicon tetrahalide, characterized in that the acid formed by the reaction between the silicon polyhalide and the water is neutralized by a neutralizing agent comprising at least one component of the group consisting of alkene oxides, alkenes, alkadienes, alkatrienes and higher alkapolyenes.

4 Claims, No Drawings

METHOD FOR INCREASING THE BONDING STRENGTH BETWEEN GRAINS IN A SUBSURFACE FORMATION ZONE

BACKGROUND OF THE INVENTION

The invention relates to a method for increasing the bonding strength between grains in a subsurface formation zone, which zone is situated adjacent to a well penetrating said formation.

The invention relates in particular to the above-mentioned method wherein silicon polyhalide in a dry inert carrier fluid (gas or liquid) is passed into a formation zone having a water-wet pore space wall and wherein the silicon polyhalide has a water reactivity that is substantially equal to that of silicon tetrahalide.

Subsurface formations containing fluids, such as hydrocarbon fluids (oil and/or gas) and/or water, being recovered via wells penetrating the formations, often comprise layers of unconsolidated or incompletely consolidated formation grains. Since the bonding strength between the grains is small (or even nil) these grains (hereinafter also referred to as sand or sand particles) will be torn from the layers by fluid flowing through the pore space of the layers to the well. These grains are likely to obstruct the fluid passage in the well and/or the surface equipment communicating with the well. The tubing in the well and the surface equipment may even be locally damaged by the erosive action of the sand carried by the fluid streams that after having passed through the perforations of the tubing impinge on the inner surfaces of tubing and further production equipment.

The use of silicon polyhalide for increasing the bonding strength between the grains of such incompetent formation layers is very attractive since this type of consolidating agent can be handled in the field in a relatively simple manner. The agent may be used in vapor phase in a dry carrier gas, and is then applied in formations wherein at least the pore space of the formation part or zone to be treated has water-wet walls and is filled with gas. This gas may be the gas that is originally present in the formation, or gas that has been injected into the formation to sweep the liquid present in the pore space of the formation part to be treated to a predetermined distance from the well.

The consolidating treatment by means of a gaseous silicon polyhalide in a carrier gas has been extensively described in Applicant's British Pat. No. 1,536,209.

Also, silicon polyhalide dissolved in a suitable non-polar solvent such as crude oil or kerosene, may be used as a consolidating agent for consolidating a formation having the pore space thereof filled with crude oil. The walls of the pore space should either be water-wet, or be made water-wet prior to injecting the silicon polyhalide, U.S. Pat. No. 3,055,426 describes such a method.

Silicon tetrachloride, silicon hexachloride, silicon octachloride, as well as silicon polyfluoride have been found useful consolidating agents for consolidating incompetent formation parts surrounding a well. The silicon polyhalide hydrolyzes with water adhering to the walls of the pore space of the formation parts to be consolidated, thereby forming an amorphous silica that bonds the formation grains together with retention of permeability of the formation.

When the silicon polyhalide is used in combination with a dry carrier gas, the mixing of the silicon polyhalide with the gas may either take place at the surface of the earth at or near the well entrance, or in the well at a level near the formation part to be consolidated. In the latter case the carrier gas and the silicon polyhalide are supplied to the said level through separate passageways in the well. The silicon polyhalide may be passed either in the gaseous phase or the liquid phase to the level of the formation part to be treated. When in the liquid phase, the silicon polyhalide is sprayed (such as atomized by a spray nozzle) into the carrier gas prior to entering the pore space of the formation part to be treated.

The silicon polyhalide after having entered the pore space reacts with the water adhering to the pore space wall. If $SiCl_4$ is used as a consolidating agent, the reaction is as follows:

$$SiCl_4 + 2H_2O \longrightarrow SiO_2 + 4HCl$$
$$\text{(a)} \quad\quad \text{(b)} \quad\quad\quad \text{(c)} \quad\quad \text{(d)}$$

(a) either in gas phase or dissolved in a non-polar solvent;
(b) liquid;
(c) amorphous;
(d) gas.

Now in certain wells, the presence of the hydrochloric acid will form a problem. The acid initially remains in the pore space of the formation, in part mixed with the injected inert carrier gas or carrier liquid, and in part dissolved in the remaining connate water. The acid is subsequently displaced from the formation into the well during the subsequent production period wherein not only hydrocarbon fluids, but also formation water may flow through the pore space to the well. Since the amount of HCl is appreciable, undesired corrosion of the metal components of the well equipment will take place which requires early replacement of such components.

It has been suggested earlier in U.S. Pat. Nos. 2,808,886 and 4,061,191 to neutralize the acid by injection of ammonia. However, gaseous ammonia and gaseous HCl form a precipitate of ammonium chloride during their reaction, which decreases the permeability of the treated formation zone, which is undesirable since this forms an increased flow resistance to the flow of hydrocarbon fluids that are to be produced from the formation via the consolidated formation zone.

An object of the present invention is a simple and reliable acid-neutralization step aimed to remove acid from the formation zone treated by a silicon polyhalide to increase the bonding strength between the grains of the said zone.

SUMMARY OF THE INVENTION

The present invention relates to increasing the bonding strength between grains in a subsurface formation zone adjacent to a well penetrating said formation, where a silicon polyhalide in a dry carrier fluid is passed into a zone having a water-wet pore space wall, using a silicon polyahlide which has a water reactivity substantially equal to that of silicon tetrahalide. In the present invention the acid formed by the reaction between the silicon polyahlide and the water is neutralized by a neutralizing agent comprising at least one component of the group consisting of alkene oxides, alkenes, alkadienes, alkatrienes and higher alkapolyenes.

The alkene oxides are also known as oxiranes or epoxides. Propene oxide is an attractive representative of this group.

Hexene and butadiene are particularly attractive compounds to be used for neutralizing the acid resulting from the consolidation reaction.

DESCRIPTION OF THE INVENTION

The neutralizing agent(s) may be passed into the pore space of the zone that is being treated, either after the injection of the fluid (liquid or gas), carrying the silicon polyahlide or simultaneously with this fluid.

In some cases it is advantageous to omit the neutralizing agent from the first part of the injected volume of fluid carrying silicon polyhalide. This should be done when treating formation parts whereof the zone close to the well has become oil-wettable by contact with drilling or completion fluids. In such zone the wettability of the pore space wall is reversed by the hydrochloric acid generated by the consolidating reaction, as a result whereof the bonding strength of the consolidation is improved.

Silicon polyhalides that are suitable for use in the method of the present invention are all silicon polyahlides that have a water reactivity substantially equal to that of silicon tetrahalide. Examples are silicon tetrachloride, silicon hexachloride, silicon octachloride, and silicon tetrafluoride.

As has been mentioned hereinabove, the silicon polyhalide is introduced into the formation part to be consolidated by means of a dry carrier fluid. A carrier fluid (gas or liquid) suitable for use in the method of the present invention is any fluid that is compatible with the silicon polyhalide and the contents of the well and the formation. Hydrocarbon liquids such as kerosene are suitable for this purpose. Examples of suitable gases are nitrogen gas, natural gas, and mixtures thereof.

The use of natural gas produced by the formation to be treated is often attractive in view of relatively low cost thereof. It may, however, be found that the produced natural gas cannot be dried sufficiently at the recovery site to prevent—when used as a carrier gas—plugging of the lines or perforations by the silica gel formed by the hydrolysis of the silicon polyhalide. It may also be found that other components of the natural gas are incompatible with the silicon polyhalides that are to be transported by the gas. In either case another gas should be selected, such as liquefied nitrogen. Both of these two latter gases are rigorously dried during their preparation and therefore attractive as carrier gas. Nitrogen gas is chemically inert and hence always compatible.

The carrier gas should be sufficiently dry to prevent early reaction of the silicon polyhalide that is transported by the gas into the formation. Within the meaning of this specification and claims, by "dry" fluid is to be understood a fluid that does not contain more water than can react with 1%w of the silicon polyhalide carried by the gas.

The neutralizing agents applied for neutralizing the acid formed by hydrolysis of the silicon polyhalide, react to form hydroxychloroalkanes, chloroalkanes or chloro-alkenes.

Particularly suitable alkene-oxides are 1,2-epoxides such as 1,2-propene oxide, 1,2-butene oxide, 1,2-isobutene oxide, 4-methyl, 1,2-pentene oxide and the like. Particularly suitable alkenes are propene, 1-butene, 2-butene, isobutene, 1-hexene, cyclohexene, 2-methyl-1-pentene, 2-methyl-2-pentene and the like. Generally the alkene to be employed will have from 2 to 12 carbon atoms, preferably from 3 to 8. Suitable alkadienes are conjugated dienes such as butadiene, isoprene, 3,5-octadiene and the like. As a rule the dienes will have from 4 to 12 carbon atoms, preferably up to 8 carbon atoms.

Preferred neutralizing agents are those which are gaseous at the conditions prevailing in the formation zone. In that event they are preferably introduced into that zone in a gaseous form. It is, however, also possible to employ non-gaseous agents which are introduced into the formation zone either as such or in the form of a diluted solution in a suitable hydrocarbon solvent.

A suitable manner of supplying the neutralizing agent to the treated formation zone is to mix the agent with the carrier fluid (liquid or gas) by which the silicon polyhalide is being transported to the zone to be treated. On entering the formation, the agent neutralizes any acid that is formed by hydrolysis of the silicon polyhalide.

In another manner, the neutralizing agent is supplied to the zone to be treated after consolidation thereof has taken place by hydrolysis of the silicon polyhalide.

The invention will now be described by way of example in more detail with reference to the following laboratory experiments and an example of a field application.

LABORATORY EXPERIMENT 1

200 gram of Clemtex No. 5 sand was packed in a stainless steel pipe and saturated with 5%w 3N HCl to render the sand water-wet.

The sand was subsequently consolidated at 70° C. and 50 bar by pumping a mixture of 970 ml kerosene and 30 ml silicon tetrachloride through the pack. At the outlet side of the pack the pressure was reduced to atmospheric by means of a back pressure regulator. During the experiment a gas/liquid mixture was observed to leave the back pressure regulator with the gas consisting of HCl.

Thereupon a similar experiment was carried out, except that the consolidating mixture consisted of 930 ml kerosene, 30 ml silicon tetrachloride and 40 ml 1,2-propene oxide.

During this experiment it was observed that only liquid effluents left the back pressure regulator, indicating that any gaseous HCl had been neutralized.

LABORATORY EXPERIMENT 2

100 gram of Oude Pekela sand was packed in a glass tube and saturated with 5%w 3N HCl. The sand was consolidated by injection of a gaseous mixture of silicon tetrachloride and 1,2-propene oxide that was prepared by bubbling nitrogen gas through a 250 ml container filled with 85 ml silicon tetrachloride and 65 ml 1,2-propene oxide. The gas mixture that had passed the pack, was fed into a wash bottle containing a NaOH solution of known initial strength. After the experiment had been completed the strength of the NaOH was determined again so as to check whether any HCl had remained unreacted with 1,2-propene oxide. From the data it appeared that more than 85% of the HCl had been neutralized.

It will be appreciated that even a larger proportion of the HCl will be neutralized in a field treatment where reaction times are longer and temperatures are higher.

DESIGN FOR A FIELD APPLICATION 1

To consolidate a formation zone around a well penetrating an incompetent formation containing oil and water, a volume of kerosene having dissolved therein silicon tetrachloride (about 10%w) and alkene oxide (about 15%w) is injected via the well into the pore space of said formation zone. The water present in the form of a thin layer on the grains of the formation reacts with the silicon tetrachloride and the precipitate generated by this reaction increases the bond present between the grains. The acid generated by the reaction is neutralized by the alkene oxide.

DESIGN FOR A FIELD APPLICATION 2

In the Design for a Field Application 1, the formation pore space wall was water-wet.

However, sometimes previous formation treatments have left this wall oil-wettable. The wettability is then reversed by a preinjection of a solution of silicon tetrachloride that is free from a neutralizing agent. The acid generated by the reaction renders the wall water-wettable. Subsequently a silicon tetrachloride solution containing a desired amount of neutralizing agent is injected. This agent neutralizes the amount of acid that would otherwise—upon opening of the well for recovery of oil—flow back to the well and corrode the metal parts thereof.

What is claimed is:

1. In a method for increasing the bonding strength between grains in a subsurface formation zone with water-wet pore walls located adjacent to a well penetrating said formation, wherein silicon polyhalide in a dry carrier fluid is passed into the said zone, with said silicon polyhalide having a water reactivity substantially equal to that of silicon tetrahalide, the improvement comprising:

neutralizing the acid formed by the reaction between the silicon polyhalide and the water by contacting it with at least one compound of the group consisting of alkene oxides, alkenes, alkadienes, alkatrienes and higher alkapolyenes.

2. The method according to claim 1, wherein the neutralizing agent is passed into the pore space of said zone simultaneously with the carrier fluid.

3. The method according to claim 1, wherein the neutralizing agent is passed into the pore space of said zone after the treatment thereof with silicon polyhalide.

4. The method according to claim 1, wherein the wall of the pore space of the formation zone to be treated is oil-wettable and the first part of the injected volume of fluid carrying the silicon polyhalide is free from neutralizing agent.

* * * * *